US007089030B2

(12) United States Patent
Vayanos et al.

(10) Patent No.: US 7,089,030 B2
(45) Date of Patent: Aug. 8, 2006

(54) DE-BOOSTING IN A COMMUNICATIONS ENVIRONMENT (75) Inventors: Alkinoos Hector Vayanos, San Diego, CA (US); Durga Prasad Malladi, San Diego, CA (US); Da-shan Shiu, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 10/644,494

(22) Filed: Aug. 19, 2003

(65) Prior Publication Data

US 2004/0100896 A1 May 27, 2004

Related U.S. Application Data (60) Provisional application No. 60/404,379, filed on Aug. 19, 2002.

(51) Int. Cl.
H04B 7/00 (2006.01)
H04J 1/12 (2006.01)

(52) U.S. Cl. ...................... 455/522; 370/201; 375/222; 375/346

(58) Field of Classification Search ................ 375/222, 375/346, 295, 316, 341, 261, 265; 370/201, 370/432; 714/755, 752, 753, 758, 779, 746, 714/786; 455/522, 501, 67.11, 67.13, 69, 455/466
See application file for complete search history.

(56) References Cited

U.S. PATENT DOCUMENTS

| 6,426,960 | B1 | 7/2002 | Antonio |
| 6,552,955 | B1* | 4/2003 | Miki ......................... 365/233 |
| 6,614,948 | B1* | 9/2003 | Jacobowitz et al. .......... 385/10 |
| 6,803,826 | B1* | 10/2004 | Gomm et al. ................. 331/11 |
| 2002/0105929 | A1* | 8/2002 | Chen et al. ................. 370/335 |
| 2003/0067899 | A9* | 4/2003 | Chen et al. ................. 370/335 |
| 2003/0070129 | A1* | 4/2003 | Ball et al. ................... 714/748 |
| 2003/0106009 | A1* | 6/2003 | Jarchi et al. ................ 714/755 |

FOREIGN PATENT DOCUMENTS

EP   1 199 834 A2   4/2002
EP   1 244 240 A2   9/2002

* cited by examiner

Primary Examiner—Edan Orgad
(74) Attorney, Agent, or Firm—Philip Wadsworth; Sandra L. Godsey; Michael D. Graham (57) ABSTRACT Systems and techniques are disclosed relating to communications. The systems and techniques involve transmitting to a remote location a first signal at a first energy level followed by a second signal at a second energy level, determining a target transmission energy level as a function of a target quality parameter at the remote location, and computing the second energy level as a function of the target transmission energy level and the first energy level. It is emphasized that this abstract is provided solely to assist a searcher or other reader to quickly ascertain the subject matter of the technical disclosure. It is submitted with the understanding that it will not be used to interpret or limit the scope or the meaning of the claims.

23 Claims, 5 Drawing Sheets

DE-BOOSTING IN A COMMUNICATIONS ENVIRONMENT

CLAIM OF PRIORITY UNDER 35 U.S.C. §119

The present Application for Patent claims priority to Provisional Application No. 60/404,379, entitled "Forward Link Deboosting," filed Aug. 19, 2002, and assigned to the assignee hereof and hereby expressly incorporated by reference herein.

BACKGROUND

1. Field

The present invention relates generally to communications, and more specifically, to deboosting in a communications environment.

2. Background

Wireless communication systems are designed to allow multiple users to share a common communications medium. One such wireless communications system is a code division multiple access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different code that modulates a carrier, and thereby, spreads the signal over the entire spectrum. The transmitted signals can be separated in the receiver by a demodulation process using a corresponding code to de-spread the desired signal. The undesired signals, whose codes do not match, contribute only to noise.

The performance of a CDMA communications system may be enhanced by providing powerful coding methods to facilitate forward error correction (FEC) capability. The coding process provides redundancy that the receiver may use to correct errors. This may be achieved by generating a data packet containing systematic symbols and redundancy symbols from a group of payload bits. The systematic symbols replicate the payload bits. A subpacket containing the systematic symbols and a portion of the redundancy symbols may be initially transmitted to the receiver. If the receiver is able to decode the data packet, the remaining redundancy symbols do not need be transmitted to the receiver. If, on the other hand, the receiver is unable to decode the data packet, a new subpacket with different redundancy symbols may be sent to the receiver on a retransmission. The subpackets may be combined and decoded jointly at the receiver, resulting in a very efficient retransmission, because the energy of the previous transmission is not discarded. This process is known in the art as incremental redundancy.

The drawback to incremental redundancy techniques is that the retransmission process consumes valuable resources. Conventional systems employing incremental redundancy have generally been configured to retransmit each subpacket as a stand-alone transmission. That is, the retransmission energy is sufficiently high such that, even if the previous transmissions had not been received, the receiver still has a good chance of being able to decode the retransmission. This is true even when the incremental energy needed to decode the data packet is very small. Accordingly, there is a need for a more efficient and robust methodology for handling retransmissions that takes into account the energy of previous subpacket transmissions derived from the same data packet.

SUMMARY

In one aspect of the present invention, a method of communications includes transmitting a first signal to a remote location at a first energy level, determining a target transmission energy level as a function of a target quality parameter at the remote location, computing a second energy level as a function of the target transmission energy level and the first energy level, and transmitting a second signal to the remote location at the second energy level.

In another aspect of the present invention, a communications apparatus includes a transmitter configured to transmit to a remote location a first signal at a first energy level followed by a second signal at a second energy level, and a processor configured to determine a target transmission energy level as a function of a target quality parameter, at the remote location and compute the second energy level as a function of the target transmission energy level and the first energy level.

In yet another aspect of the present invention, a communications apparatus includes means for transmitting to a remote location a first signal at a first energy level followed by a second signal at a second energy level, determining means for determining a target transmission energy level as a function of a target quality parameter at the remote location, and means for computing the second energy level as a function of the target transmission energy level and the first energy level.

It is understood that other embodiments of the present invention will become readily apparent to those skilled in the art from the following detailed description, wherein it is shown and described only several embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention can be practiced. The embodiments described throughout this disclosure are intended to serve as an example, instance, or illustration and should not necessarily be construed as preferred or advantageous over other embodiments. The detailed description includes specific details for the purpose of providing a thorough understanding of the present invention; however, it will be apparent to those skilled in the art that the present invention may be practiced without these specific details. In some instances, well-known structures and devices are shown in block diagram form in order to avoid obscuring the concepts of the present invention.

In the following detailed description, various aspects of the present invention will be described in the context of a CDMA communications system supporting high speed data applications. While these inventive aspects may be well suited for in use this application, those skilled in the art will readily appreciate that these inventive aspects are likewise applicable for use in various other communication environments. Accordingly, any reference to a CDMA communications system is intended only to illustrate the inventive aspects, with the understanding that such inventive aspects have a wide range of applications.

Figure 1:
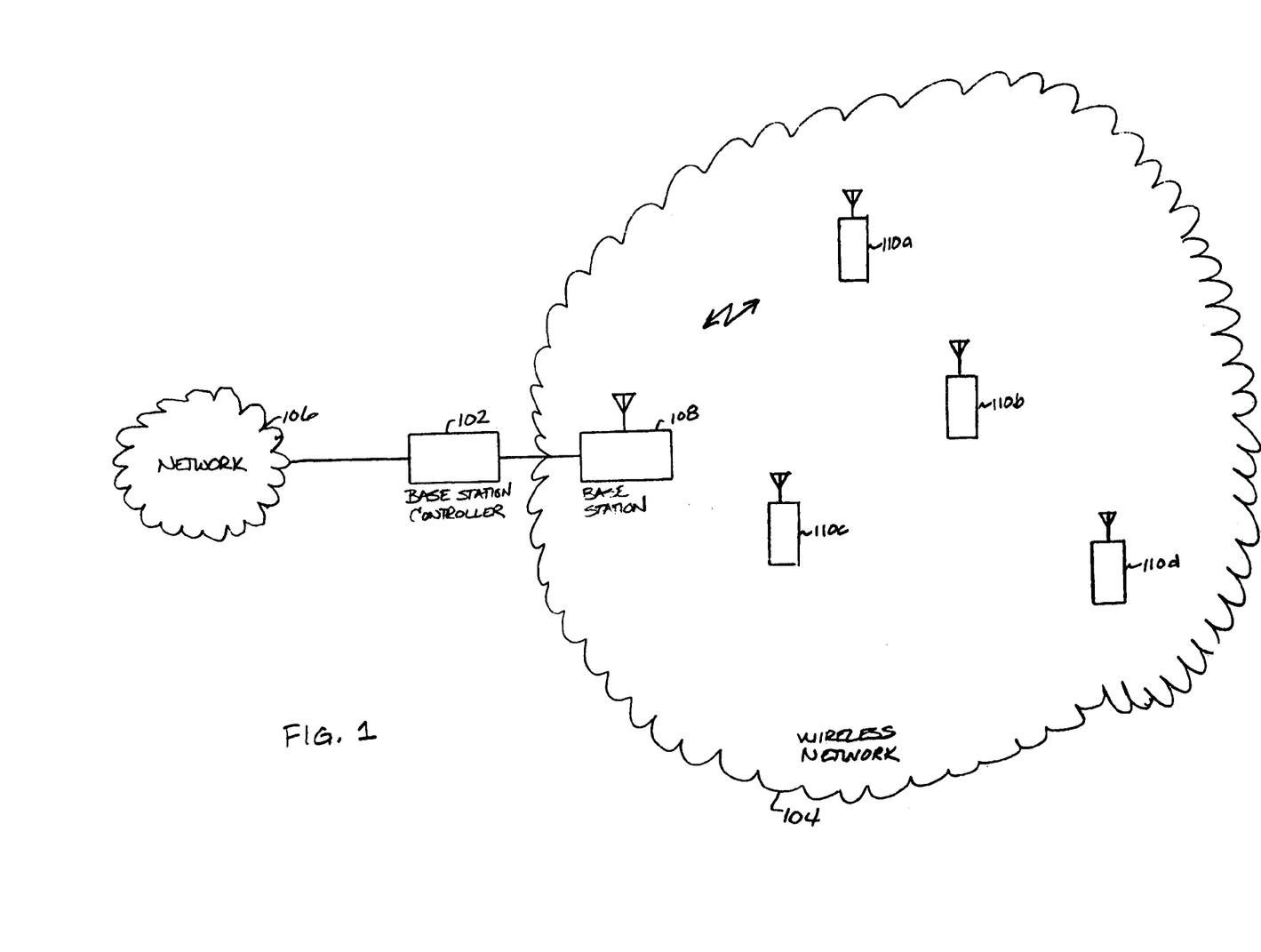
FIG. 1 is a conceptual block diagram of an embodiment of a CDMA communications system.

FIG. 1 is a conceptual block diagram of an embodiment of a CDMA communications system with de-boosting capability. A base station controller 102 (BSC) may be used to interface a wireless network 104 to an existing network infrastructure 106. The network infrastructure 106 may be a packet-switched network, such as the Internet, a corporate intranet, or the like. Alternatively, the network infrastructure 106 may be a circuit-switched network, such as a public switched telephone network (PSTN). The wireless network 104 may be implemented with any number of base stations dispersed throughout a geographic region. The geographic region may be subdivided into smaller regions known as cells with a base station serving each cell. In high traffic applications, the cell may be further divided into sectors with a base station serving each sector. For simplicity, one base station 108 is shown serving an entire sector under control of the BSC 102. A number of subscriber station 110A–110D operating within the sector may communicate with one another, or access the network 106 through one or more base stations.

When power is initially applied to the subscriber station 110A, it may attempt to establish a wireless connection with the base station 108 using a predetermined access procedure. The access procedure involves the acquisition of a pilot transmitted over a forward link. The forward link refers to transmissions from the base station 108 to a subscriber station, and a reverse link refers to transmissions from a subscriber station to the base station 108. Once the subscriber station 110A acquires the pilot, it may access a forward link synchronization channel to acquire broadcast system information, and send a registration request to the base station 108 over the reverse link using an access channel. The base station 108 then forwards the registration request to the BSC 102. In response, the BSC 102 registers the subscriber station 110A, and sends a response back to the subscriber station 110A acknowledging registration.

The BSC 102 may then initiate a call from the network 106 to the subscriber station 110 by directing the base station 108 to page the subscriber station 110A over a paging channel. In response, the subscriber station 108 may transmit signaling messages over the access channel back to the base station 108 indicating that it is ready to receive the call. Alternatively, the subscriber station 110A may initiate the call by signaling the base station 108 over the access channel. In any event, once a call is initiated, a logical resource connection may be established between the base station 108 and the subscriber station 108, and the base station 110A may assign an address to the subscriber station 110A to identify communications intended for the subscriber station over that connection. The address may be transmitted from the base station 108 to the subscriber station 110A with the exchange of signaling messages during call set up. A traffic channel may then be established between the base station 108 and the subscriber station 110A to support the call. A subscriber station with a traffic channel established in said to be an active subscriber station. Depending on the amount of data to be sent between the base station 108 and the subscriber station 110A, multiple channels may be allocated to the traffic channel. The channel allocations may be based on orthogonal spreading sequences known as Walsh codes.

During the call, the subscriber station 110A may feed back information to the base station 108 relating to the quality of the forward link under current channel conditions. In a manner to be described in greater detail later, the feedback may be used by the base station 108 to limit the transmission power of the forward link to that necessary to achieve a desired quality of service. The feedback may be based on a carrier-to-interference (C/I) ratio computed at the subscriber station 110A from the forward link pilot by means well known in the art. Based on this feedback, as well as resource availability and user priorities among the various subscriber stations 110A–110D, the base station 108 may schedule the forward link transmission of one or more data packets to the subscriber station 110A over the traffic channel.

The forward link transmission generated by the base station 108 may also include a data packet control channel associated with the traffic channel. The packet data control channel, which may be common to all subscriber stations 110A–110D, may be used to carry information packets addressed to individual subscriber stations. Each information packet may be used by the intended subscriber station to receive or decode a corresponding data subpacket carried on its respective traffic channel. The information packet may be synchronized with its corresponding data subpacket or may be offset in time. If the subscriber station 110A identifies an information packet with its address, the subscriber station 110A may attempt to decode the corresponding data subpacket. An acknowledgement (ACK) message may be sent from the intended subscriber station 110A to the base station 108 over a reverse link ACK channel if the intended subscriber station 110A is able to decode the data packet from the subpacket. If, on the other hand, the data packet is not successfully decoded at the intended subscriber station 110A, a negative acknowledgement (NAK) message may be sent to the base station over the reverse link ACK channel requesting that the base station 108 transmit another subpacket from the same data packet.

Figure 2:
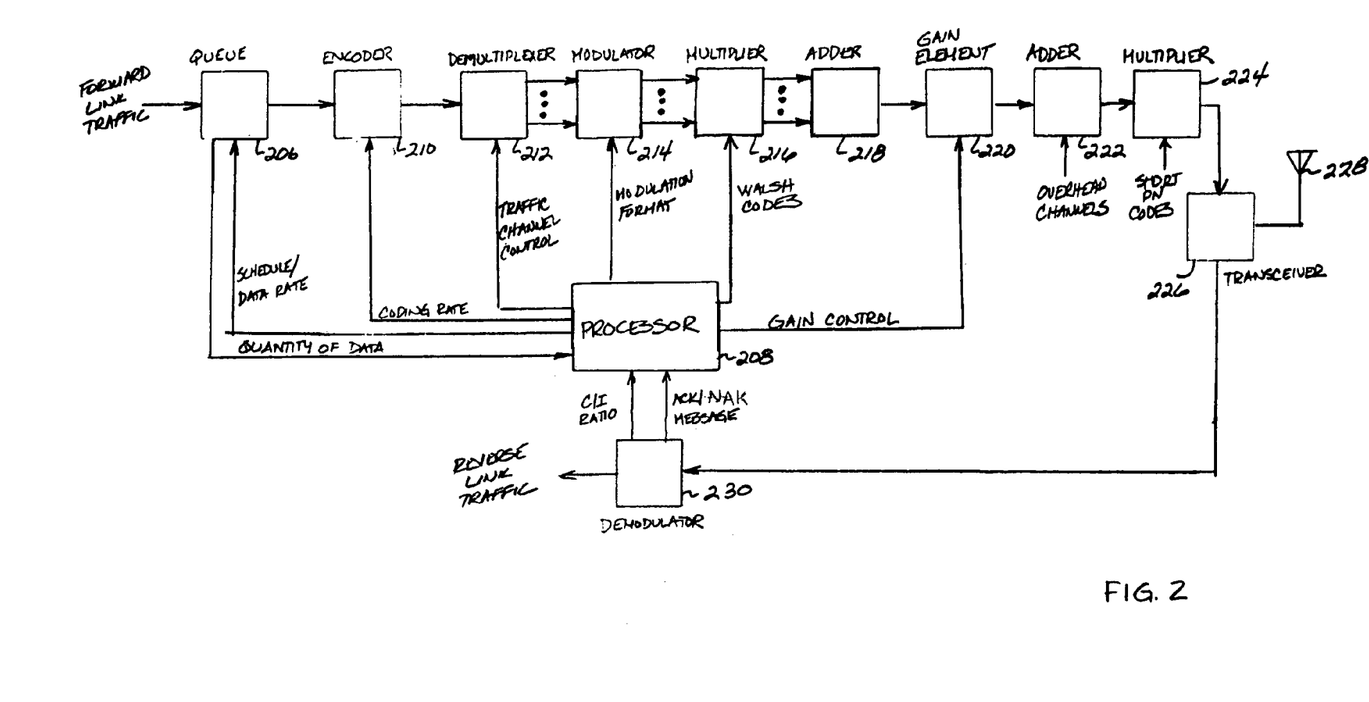
FIG. 2 is a functional block diagram of an embodiment of a base station.

FIG. 2 is a functional block diagram of an embodiment of a base station. The base station may be configured to receive data from the BSC (not shown) over a logical resource connection established during call set up. The data may be stored in a queue 206 at the base station, which buffers the data from the BSC (not shown) before transmission to the subscriber station. A processor 208 may be used to release a portion of the data, or payload, from the queue 206 to an encoder 210 at a fixed or variable rate. In CDMA communication systems supporting variable data rates, the C/I ratio fed back from the subscriber station 110 to the base station 108 may be used by the processor 208 to efficiently transmit the forward link traffic at the highest possible data rate under current channel conditions.

The encoder 210 may be used to apply an iterative coding process to the payload, such as Turbo coding. The coding process may be used to produce a data packet containing systematic symbols and redundancy symbols from a group of payload bits released by the processor 208 from the queue 206. The number of payload bits divided by the number of coded symbols produced from the coding process is generally referred to as the coding rate. The lower the coding rate, the higher the coding gain. This coding gain enables the base station 108 to reduce the transmission energy and achieve the same bit error rate (BER) at the subscriber station 110 because of an increase in redundancy. The BER is typically used by those skilled in the art as a design parameter which defines the minimum quality of service.

The manner in which the coded symbols are sent to the subscriber station 110 depends on whether the base station is sending an initial transmission or a retransmission of the data packet. If the data packet is queued for initial transmission to the subscriber station 110, the encoder 210 may package the systematic symbols and a portion of the redundancy symbols into a subpacket. If, on the other hand, the data packet is queued for a retransmission, a new subpacket with different redundancy symbols may be used. In any event, the coded symbols in the subpacket may be provided to a demultiplexer 212 to generate multiple traffic subchannels. In some embodiments, the coded symbols in the subpacket may be interleaved and scrambled using a long pseudo-random noise (PN) sequence before being provided to the demultiplexer 212.

A modulator 214 may be used to map multiple coded symbols from each traffic subchannel to a single modulation symbol in a signal constellation. By mapping multiple coded symbols to a single modulation symbol, improvements in bandwidth efficiency may be achieved. The number of coded symbols that may be represented by a modulation symbol is referred to as the modulation order, and is a function of the modulation scheme. By way of example, QPSK (quadrature phase shift keying) employs a signal constellation wherein two coded symbols may be mapped to a modulation symbol. A higher order modulation scheme, such as 16-QAM, may be used to map four coded symbols to a modulation symbol making it more bandwidth efficient than QPSK. The modulator 214 may be implemented with any modulation scheme known in the art. In at least one embodiment of the base station, the modulation scheme may be programmed by the processor 208.

We can define the transmission format as the combination of the modulation and the set of coded symbols being transmitted. Each format may have different performance, which can be captured by its target energy-per-bit $(E_b/N_t)_{target}$, i.e., the receive energy per bit needed to decode the packet with a given BER. This performance measure is loosely linked to a given receiver implementation but can be derived by means well known in the art.

Channel separation may be achieved by spreading each traffic subchannel with a different Walsh code provided by the processor 208. A multiplier 216 may be used to multiply each modulation symbol with its respective Walsh code to produce n chips per modulation symbol. The value n is generally referred to as the spreading factor. The channels may then be combined with an adder 218 to produce a forward link traffic channel having a chip rate equal to the modulated symbol rate times the spreading factor.

The forward link traffic channel from the adder 218 may be provided to a gain element 220. A gain signal computed by the processor 208 may be applied to the gain element 220 to control the transmission energy of the forward link traffic channel. The transmission energy of the forward link traffic channel $(E_c/I_{or})$ is generally expressed as the ratio between the transmission power of the forward link traffic channel to the total power of the base station. The $E_c/I_{or}$ may be computed by determining the target energy-per-chip $(E_c/N_t)_{target}$ required at the subscriber station to meet the minimum quality of service requirements with the selected format, and adding to that value enough energy to overcome the losses associated with the forward link. The $(E_c/N_t)_{target}$ may be computed from the $(E_b/N_t)_{target}$ using the following equation:

$$(E_c/N_t)_{target} = (E_b/N_t)_{target}(\text{subpacket coding rate})(\text{modulation order})/(\text{spreading factor}) \quad (1)$$

The losses associated with the forward link may be estimated based on the C/I ratio fed back to the base station 108 from the subscriber station 110 by means well known in the art. The $E_c/I_{or}$ required for the transmission may then be computed from the following equation:

$$E_c/I_{or} \text{dB} = (E_c/N_t)_{target} \text{dB} - (C/I \text{ ratio}) \text{dB} + (E_{cp}/I_{or}) \text{dB} \quad (2)$$

where $E_{cp}/I_{or}$ is the ratio between the transmission power of the forward link pilot to the total power of the base station (typically between 10 and 20%).

The forward link traffic channel from the gain element 220 may be provided to a second adder 222 where it may be combined with other overhead channels, such as the packet data control channel. Each overhead channel may be encoded, modulated and spread with its own unique Walsh code to maintain channel separation. The combined signal may then be provided to a multiplier 224 where it may be quadrature spread using short PN codes. The short PN codes are a second layer of coding that is used to isolate one sector from another. The approach allows the reuse of Walsh codes in every sector. The quadrature modulated signal may then be provided to a transceiver 226 for filtering, upconvertion, amplification, and transmission over the forward link via an antenna 228 to the subscriber station.

Figure 3:
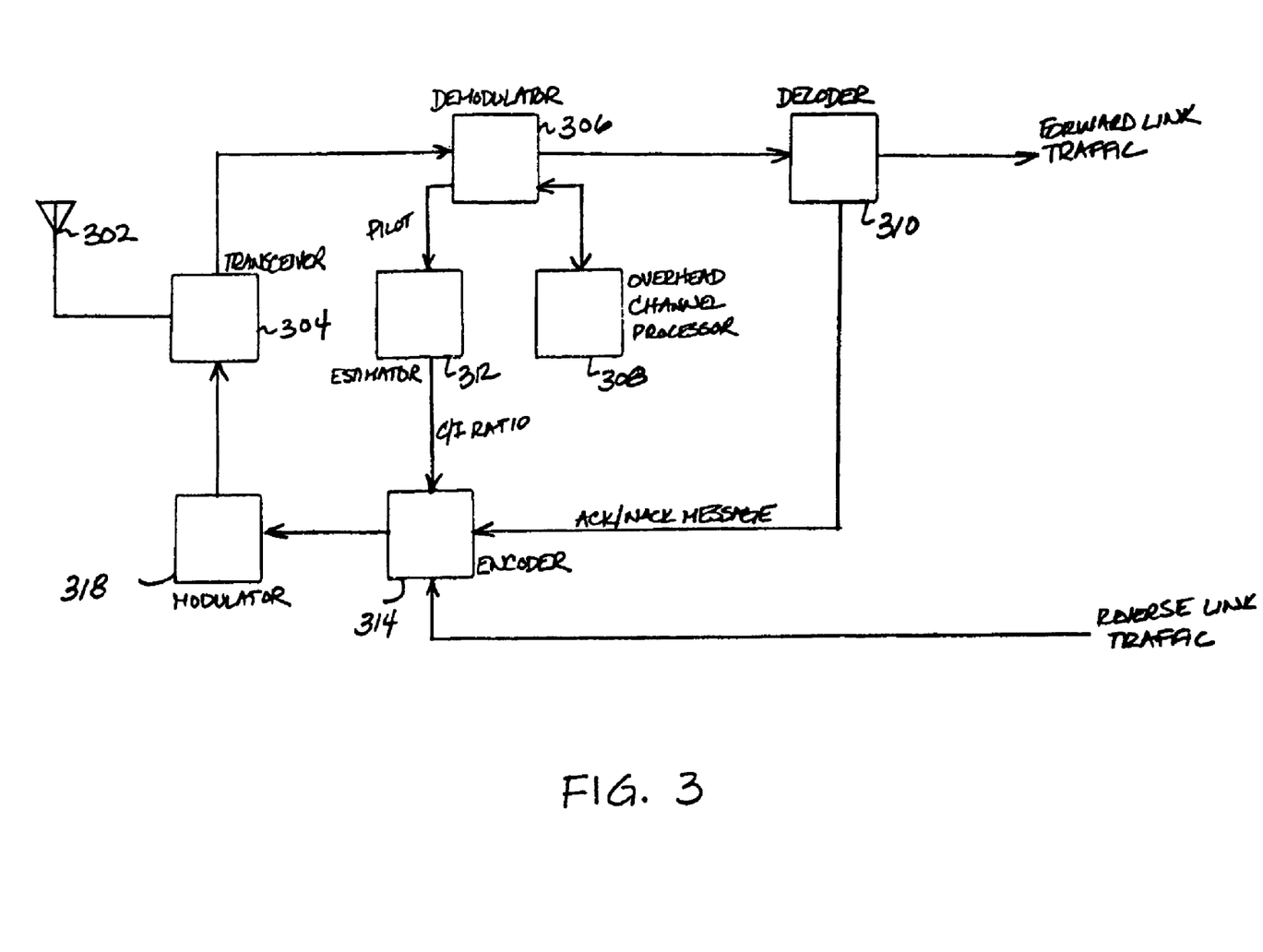
FIG. 3 is a functional block diagram of an embodiment of a subscriber station.

FIG. 3 is a functional block diagram of an embodiment of a subscriber station. The forward link transmission may be received at the subscriber station with an antenna 302 and coupled to a transceiver 304. The transceiver 304 may be configured to filter and amplify the forward link transmission, and downconvert it to baseband. A demodulator 306 may be used to quadrature demodulate the forward link transmission, and then separate the traffic subchannels through a de-spreading process to extract the packet data control channel. The packet data control channel may be provided to an overhead channel processor 308 to perform various signal processing functions to determine whether it is addressed to the subscriber station. Assuming the overhead channel processor 308 determines that the information packet carried on the packet data control channel is addressed to the subscriber station, the information may be used by the demodulator 306 to de-map the sequence of modulated symbols from each traffic subchannel. The demodulated symbols from the traffic subchannels may then be demultiplexed and provided to a decoder 310 for further processing. In some embodiments, the coded symbols may be descrambled using the long PN code and de-interleaved before being provided to the decoder 310. In any event, the symbols provided to the decoder 310 may be combined with previous transmissions from the same data packet and jointly decoded using the information from the packet data control channel. An ACK or NAK message may be generated by the decoder 310 to indicate whether the data packet has been successfully decoded.

The forward link pilot is typically not encoded, and therefore, may be coupled directly from the demodulator 306 to an estimator 312. Since the pilot symbol sequence is known, a priori, it can be stored in memory (not shown) at the subscriber station. Based on the demodulated symbols from the forward link pilot and the pilot symbol sequence stored in memory, the estimator 312 may compute a C/I ratio. The C/I ratio computation may be performed by any means known in the art including a mean square error (MSE) algorithm or any other applicable algorithm.

An encoder 314 may be used to perform various signal processing functions on one or more reverse link traffic channels, such as iterative coding and interleaving. The encoded traffic together with the ACK or NAK message from the decoder 310 and the C/I ratio from the estimator 312 may be provided to a modulator 318. The C/I ratio and the ACK or NAK message may be placed on the appropriate channels, combined with the traffic channels, spread with the long PN code, quadrature modulated with the short PN codes, and provided to the transceiver 304 for upconversion, filtering and amplification before being transmitted over the reverse link through the antenna 302 to the base station.

Turning back to FIG. 2, the reverse link transmission at the base station may be coupled from the antenna 228 to the transceiver 226 where it may be amplified, filtered and downconverted to baseband before being provided to a demodulator 230. The demodulator 230 may be configured to perform some of the various functions described earlier in connection with the demodulation process, as well as extract the ACK or NAK message and the C/I ratio from the reverse link transmission. The ACK or NAK message, along with the C/I ratio may be provided to the processor 208 to perform various control and scheduling functions on the forward link.

The processor 208 may be used to coordinate the forward link transmissions of the base station to all subscriber stations 110A–110D (see FIG. 1) in its sector. In at least one embodiment of the base station, the processor 208 receives information from the queue 206 indicating the amount of data to be transmitted to each active subscriber station over the forward link. Based on this information, in combination with the C/I ratio, the minimum quality of service requirements and delay constraints, the processor 208 may schedule the forward link transmissions to achieve maximum data throughput while maintaining some form of fairness among multiple subscriber stations.

When a forward link transmission is scheduled for the subscriber station, the processor 208 may also select the transmission format for each subpacket. By way of example, the processor 208 may select the data rate, the coding rate and the modulation format based on the quality of the forward link. Depending on the amount of data to be sent, the processor 208 may select the payload size and assign the appropriate number of Walsh channels to support the payload at the selected data rate, coding rate, and modulation format. By way of example, in a relatively distortion free environment with little or no interference, the processor 208 may use relatively few Walsh codes to transmit a large payload at a high data rate and a low coding gain with a 16-QAM modulation format. Conversely, when the quality of the forward link is poor, the processor 208 may use many Walsh channels to transmit a small payload at a low data rate and a high coding gain with a QPSK modulation format. In some embodiments of the base station, the length of the subpacket may also be varied. By way of example, many CDMA communication systems today provide a subpacket transmission over one, two, four or eight 1.25 millisecond (ms) slots.

In CDMA communication systems using incremental redundancy, the processor 208 may employ a de-boosting algorithm that takes into account the energy previously transmitted for the same data packet when selecting a retransmission format. With this approach, only the incremental energy needed to meet the minimum quality of service requirements would be transmitted. The energy from the retransmission could then be combined at the subscriber station with the energy from the previous transmissions for the same data packet and decoded jointly. One de-boosting approach takes into account the amount of energy transmitted previously from the same data packet, and reduces the total retransmission energy by this amount. When implementing this approach, a thresholding function should be applied to ensure that the energy-per-symbol ($E_s/N_t$) does not drop below a predetermined level. Alternatively, the total retransmission energy may be reduced by decreasing the coding gain to maintain a sufficiently high $E_s/N_t$.

Figure 4:
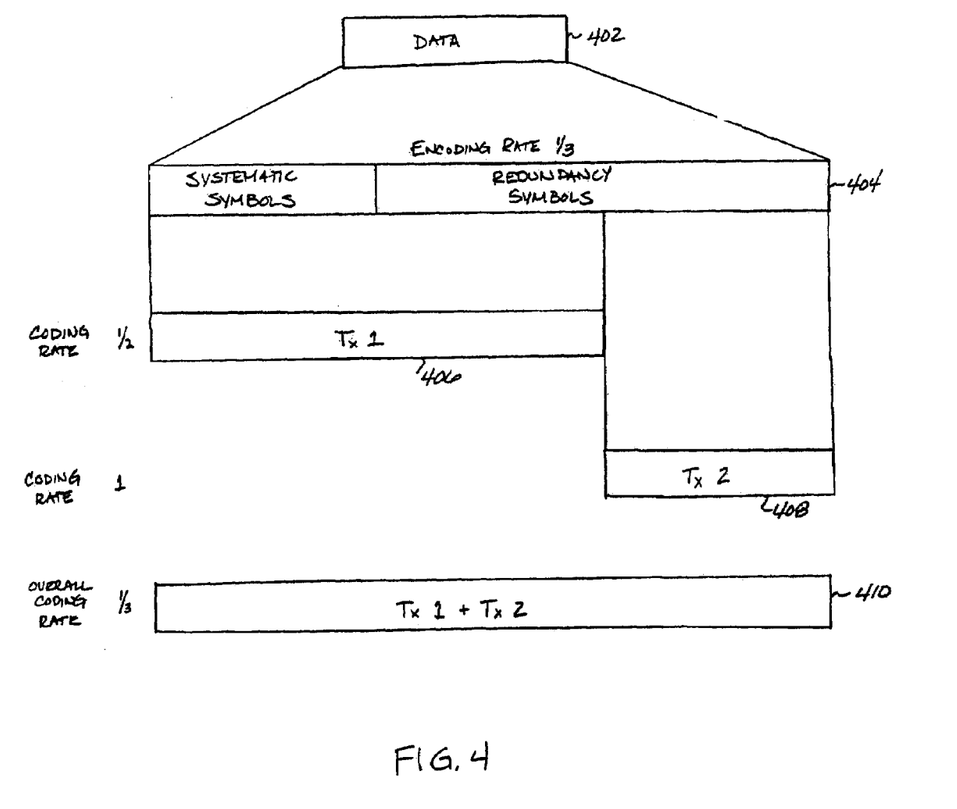
FIG. 4 is a graphical representation illustrating a simplified example of a de-boosting function.

A simplified illustration of this latter concept will be explained with reference to FIG. 4. Initially, a payload 402 having x bits may be selected and encoded using an iterative coding process. A coding rate of 1/3 may be used to produce a data packet 404 containing 3x symbols. This represents the minimum coding rate, or maximum coding gain, available. Because of the prevailing channel conditions, the initial transmission is made at a coding rate of 1/2 with a subpacket 406 containing twice as many symbols as payload bits, or 2x symbols. The subpacket 406 includes all the systematic symbols and one-half the redundancy symbols from the data packet 404.

On retransmission, there is no need to send more symbols than required to achieve the minimum coding rate at the receiver. Accordingly, a second subpacket 408 should be constructed from the data packet 404 with no more than x symbols (i.e, the remaining redundancy symbols). However, the total retransmission energy may be computed at the combined coding rate for both subpackets as seen by the receiver. In other words, the second subpacket 408 is not transmitted as a stand alone transmission at an extremely high energy level to support a coding rate of 1. Instead, the total retransmission energy may be computed based on the total number of symbols from both subpacket transmissions. In this case, the transmission of the second subpacket 408 with x symbols will result in 3x symbols being combined at the receiver 410. Accordingly, the total retransmission energy for the second subpacket 408 may be computed at a 1/3 coding rate.

Figure 5:
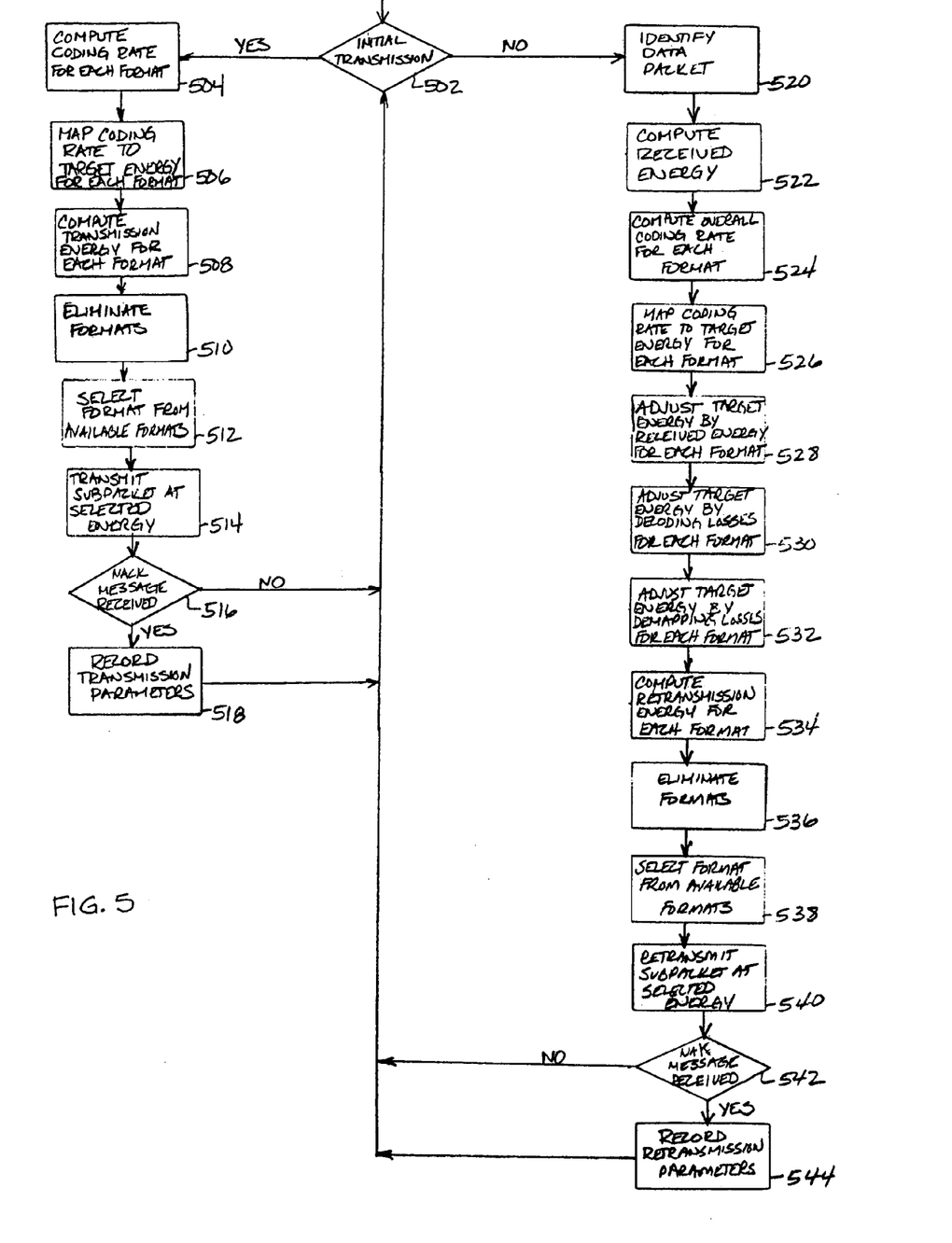
FIG. 5 is a flow diagram illustrating a detailed example of a de-boosting function.

FIG. 5 is a flow chart illustrating a detailed example of a de-boosting operation performed by the processor 208 (see FIG. 2). In the following example, the processor may be used to control the transmission to the subscriber station of a first signal at a first energy level followed by a second signal at a second energy level. The second energy level may be computed by the processor as a function of a target transmission energy level and the first transmission energy level. The target transmission level may be computed by the processor as a function of a target quality parameter at the subscriber station. Alternatively, these de-boosting functions may be performed by multiple processors each performing one or more of the de-booting functions The processor may be implemented in electronic hardware, computer software, or a combination of the two. The processor may be implemented with a general or specific purpose processor, a digital signal processor (DSP), an application specific integrated circuit (ASIC), a field programmable gate array (FPGA) or other programmable logic, discrete gate or transistor logic, discrete hardware components, any combination thereof, or any other equivalent or non-equivalent structure designed to perform one or more of the de-boosting functions.

Referring to FIG. 5, the processor may determine, in step 502, whether certain resources should be used to support an initial transmission of a new data packet or a retransmission of a data packet previously queued based on the scheduling decisions made earlier. If the processor determines that an initial transmission of a new data packet should be made, then in step 504, the processor may compute the number of coded symbols and the coding rate that can be supported by every transmission format. The various transmission formats should include every possible permutation of payload size, data rate, modulation order, number of Walsh channels-per-subpacket, and number of slots-per-subpacket that the base station can support. The number of coded symbols may be computed from the following equation:

$$\text{No. of Coded Symbols} = W_{\textit{Traffic}}(\text{Chip Rate})/W_{\textit{Total}}(\text{Modulation Order}) \quad (3)$$

where $W_{\textit{Traffic}}$ is the number of Walsh codes assigned to the transmission format; and $W_{\textit{Total}}$ is the total number of forward link Walsh codes available to the base station.

The coding rate may be computed by dividing the number of payload bits by the number of coded symbols for each transmission format. If the computed coding rate is lower than the minimum coding rate, the minimum coding rate should be used.

In step 506, each transmission format may be mapped to the associated target $E_b/N_t$. Based on the target $E_b/N_t$, the transmission energy $E_c/I_{or}$ needed to support each transmission format may be computed, in step 508, from equations (1) and (2). If the computed $E_c/I_{or}$ exceeds the total available power for any transmission format, then that transmission format may be eliminated as a possible choice to support the initial transmission in step 510. The transmission format with the highest data rate whose $E_c/I_{or}$ is within the available power range for the forward link traffic channel may be selected in step 512. A subpacket may then be transmitted over the forward link, in step 514, using the selected transmission format.

In step 516, the processor awaits a response from the initial transmission. If a NAK message is not received, either because an ACK message is received or no response is received within a predetermined time, the processor may loop back to step 502. Conversely, if a NAK message is received, the parameters for the initial transmission format may be recorded at the base station, in step 518, for later use during retransmission. Specifically, the recorded parameters may include the number of coded symbols transmitted as well as the transmission energy $E_c/I_{or}$. The processor may then loop back to step 502.

In the event that the processor determines, in step 502, that certain resources should be used to support a retransmission, the processor may identify the data packet queued for retransmission in step 520. The processor may then compute, in step 522, the energy expected to have been received by the subscriber station for all previous transmissions from the same data packet. This may be achieved by computing the accumulated energy-per-chip $(E_c/N_t)_{accumulated}$ received by the subscriber station from the $E_c/I_{or}$, recorded for each transmission of such data packet. The computation of the accumulated received energy may take into account potential de-mapping losses based on the received energy-per-symbol $(E_s/N_t)_{accumulated}$ during the associated transmission. De-mapping losses generally occur in the case of higher order modulation (e.g., 8 PSK or 16 QAM) due to the fact that the combining of multiple transmissions occurs at the coded symbol level and may be estimated by means well known in the art for a given receiver implementation. The accumulated $(E_s/N_t)_{accumulated}$ can be computed from the following equation:

$$(E_s/N_t)_{accumulated} = (E_c/N_t)_{accumulated}/(\text{spreading factor}) \quad (5)$$

Once the de-mapping losses are computed, the accumulated energy-per-symbol $(E_s/N_t)_{accumulated}$ may be adjusted by the de-mapping losses. The accumulated energy-per-chip $(E_c/N_t)_{accumulated}$ may then be computed from the adjusted $(E_s/N_t)_{accumulated}$.

The processor may use the C/I estimation at the time of transmission and assume a completely stable forward link wireless channel to estimate the received energy. If C/I information measured closer in time to the transmission event becomes available, this may be used as an estimate of the link quality. For fast fading channels, an average of the forward link quality may be a more appropriate measure. Either way, a correction factor may be added to account for errors in the C/I ratio. If a correction factor is used, its value may be dependent on the velocity of the subscriber station if that can be determined.

Next, the processor may compute a target transmission energy level for each retransmission format. This may be achieved by first computing the overall coding rate for each retransmission format in step 524. Note that the number of possible retransmission formats should be significantly reduced because the payload size is fixed by the initial transmission. The overall coding rate for each possible retransmission format is based on the number of coded symbols supported by that retransmission format plus the accumulated number of coded symbols received by the subscriber station for the same data packet. The accumulated number of symbols may be determined from the recorded parameters of the previous transmissions. Once the overall coding rates are computed, then for each retransmission format, its respective overall coding rate may be mapped, in step 526, to a target transmission energy-per-bit $(E_b/N_t)_{target}$ as a function of the BER by means well known in the art, and converted to a target transmission energy-per-chip $(E_c/N_t)_{target}$.

The accumulated energy $(E_c/N_t)_{accumulated}$ received by the subscriber station (computed in step 522) may then be subtracted from the target transmission energy-per-chip $(E_c/N_t)_{target}$ for each possible retransmission format in step 528. The resulting computation yields a retransmission energy-per-chip $(E_c/N_t)_{retransmission}$ for each possible retransmission format. The $(E_c/N_t)_{retransmission}$ for each possible retransmission format may be adjusted, in step 530, for incremental redundancy losses associated with the joint decoding of symbols received from multiple transmissions. Since the performance of forward error correction codes in general, and Turbo codes in particular, is affected by the distribution energy across the symbols, it may be prudent to apply some decoding losses. The decoding losses would be a function of the overall coding rate and the signal-to-noise ration (SNR) distribution across the data packet, and may be computed by means well known in the art. In the case of higher order modulations, each $(E_c/N_t)_{retransmission}$ may be further adjusted, in step 532, for de-mapping losses corresponding to the expected received energy-per-symbol $E_s/N_t$ for the retransmission. In any event, the retransmission energy $E_c/I_{or}$ needed to support each retransmission format may then be computed, in step 534, from its respective $(E_c/N_t)_{retransmission}$ in accordance with equation (2). Next, retransmission formats having a computed $E_c/I_{or}$ that exceeds the available power may be eliminated in step 536. The retransmission format with the highest data rate whose $E_c/I_{or}$ is within the available power range for the forward link traffic channel may be selected in step 538. A subpacket may then be transmitted over the forward link, in step 540, using the selected retransmission format.

In step 542, the processor awaits a response from the retransmission. If a NAK message is not received, either because an ACK message is received or no response is received within a predetermined time, the processor may loop back to step 502. Conversely, if a NAK message is received, the parameters for the selected retransmission format may be recorded at the base station, in step 544, for later use during a subsequent retransmission. The processor may then loop back to step 502.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such the processor can read information from, and write information to, the storage medium. In the alternative, the storage medium may be integral to the processor. The processor and the storage medium may reside in an ASIC. The ASIC may reside in a subscriber station. In the alternative, the processor and the storage medium may reside as discrete components in a subscriber station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting a payload of data bits, comprising:
    encoding the payload of data bits to generate a data packet containing systematic symbols replicating the data bits and redundancy symbols;
    transmitting a first subpacket containing the systematic symbols and a first portion of the redundancy symbols to a remote location; and
    in response to receiving a NAK message from the remote location, transmitting a second subpacket containing a second portion of the redundancy symbols to the remote location in accordance with a transmission format selected as a function of a computed expected total energy received at the remote location due to transmission of the first subpacket.

2. The method of claim 1 wherein the expected total energy received at the remote location due to transmission of the first subpacket is computed as a function of a number of symbols expected to have been received at the remote location.

3. The method of claim 2 wherein the transmission format is selected as a function of the computed expected total energy received at the remote location due to transmission of the first subpacket and the total number of symbols in the first and second subpackets.

4. The method of claim 1 wherein the transmission format is further selected as a function of expected losses at the remote location related to decoding the first and second subpackets jointly.

5. The method of claim 1 wherein the expected total energy received at the remote location is adjusted as a function of expected losses at the remote location relating to de-mapping the first subpacket.

6. The method of claim 1 wherein the transmission format is selected based on a target transmission energy level computed as a function of a coding rate of the combined first and second subpackets.

7. The method of claim 1 wherein the first subpacket is transmitted at a first coding rate, and the second subpacket is transmitted at a second coding rate higher than the first coding rate.

8. The method of claim 1 wherein the transmission format is further selected as a function of feedback from the remote location relating to wireless channel quality.

9. The method of claim 1 wherein the transmission format is selected as a function of a target transmission energy level corresponding to a potential transmission format and the computed expected total energy received at the remote location due to transmission of the first subpacket adjusted by expected losses at the remote location relating to de-mapping the first signal.

10. The method of claim 9 wherein the transmission format is selected by:
    subtracting the adjusted computed expected total energy received at the remote location due to transmission of the first subpacket from the target transmission energy level for the potential transmission format;
    computing a retransmission energy for the potential transmission format; and
    eliminating the potential transmission format from consideration if the computed retransmission energy exceeds a threshold level.

11. The method of claim 8 wherein the feedback comprises an error rate at the remote location.

12. A communications apparatus for transmitting a payload of data bits encoded in a data packet as a plurality of systematic symbols and redundancy symbols, comprising:
    a transmitter configured to transmit to a remote location a first subpacket containing the systematic symbols and a first portion of the redundancy symbols followed by a second subpacket containing a second portion of the redundancy symbols; and a processor configured to select a transmission format for the second subpacket as a function of a computed level of expected energy received at the remote location due to transmission of the first subpacket, wherein the processor is further configured to compute the level of expected energy received at the remote location due to transmission of the first subpacket as a function of the number of symbols contained in the first subpacket, and wherein the processor is configured to compute a target transmission energy level as a function of the total number of symbols contained in the first and second subpackets.

13. The communications apparatus of claim 12 wherein the processor is further configured to adjust the target transmission energy level as a function of expected losses at the remote location related to decoding the first and second subpackets jointly.

14. The communications apparatus of claim 12 wherein the processor is further configured to compute the target transmission energy level as a function of a coding rate of the combined first and second subpackets.

15. The communications apparatus of claim 12 further comprising an encoder configured to encode the first subpacket at a first coding rate and the second subpacket at a second coding rate higher than the first coding rate.

16. The communications apparatus of claim 12 wherein the processor is further configured to compute the level of expected energy received at the remote location due to transmission of the first subpacket as a function of feedback from the remote location relating to wireless channel quality.

17. The communications apparatus of claim 16 wherein the feedback comprises an error rate at the remote location.

18. The communications apparatus of claim 12 wherein the processor is further configured to select the transmission format as a function of the target transmission energy level and the computed level of expected energy received at the remote location due to transmission of the first subpacket adjusted by expected losses at the remote location relating to de-mapping the first subpacket.

19. The communications apparatus of claim 18 wherein the processor is further configured to compute a retransmission energy level by subtracting the adjusted computed level of expected energy received at the remote location due to transmission of the first subpacket from the target transmission energy level.

20. A communications apparatus for transmitting a payload of data bits encoded in a data packet as a plurality of systematic symbols and redundancy symbols, comprising:

a transmitter configured to transmit to a remote location a first subpacket containing the systematic symbols and a first portion of the redundancy symbols followed by a second subpacket containing a second portion of the redundancy symbols; and a processor configured to select a transmission format for the second subpacket as a function of a computed level of expected energy received at the remote location due to transmission of the first subpacket, wherein the processor is further configured to adjust the computed level of expected energy received at the remote location due to transmission of the first subpacket as a function of expected losses at the remote location relating to de-mapping the first subpacket.

21. A communications apparatus for transmitting a payload of data bits encoded in a data packet as a plurality of systematic symbols and redundancy symbols, comprising:

means for transmitting to a remote location a first subpacket containing the systematic symbols and a first portion of the redundancy symbols followed by a second subpacket containing a second portion of the redundancy symbols;

determining means for determining a target transmission energy level as a function of a computed level of expected energy received at the remote location; and means for selecting a transmission format for the second subpacket as a function of the target transmission energy level, wherein the determination of the target transmission energy level by the determining means is further a function of characteristics of the first and second subpackets, and wherein the determination of the target transmission energy level by the determining means is further a function of the total number of symbols contained in the first and second subpackets.

22. The communications apparatus of claim 21 further comprising means for encoding the first subpacket at a first coding rate and the second subpacket at a second coding rate higher than the first coding rate.

23. A communications apparatus for transmitting a payload of data bits encoded in a data packet as a plurality of systematic symbols and redundancy symbols, comprising:

means for transmitting to a remote location a first subpacket containing the systematic symbols and a first portion of the redundancy symbols followed by a second subpacket containing a second portion of the redundancy symbols;

determining means for determining a target transmission energy level as a function of a computed level of expected energy received at the remote location; and means for selecting a transmission format for the second subpacket as a function of the target transmission energy level, wherein the determination of the target transmission energy level by the determining means is further a function of a coding rate of the combined first and second subpackets.

* * * * *